United States Patent
Chow et al.

(10) Patent No.: US 8,184,110 B2
(45) Date of Patent: May 22, 2012

(54) METHOD AND APPARATUS FOR INDIRECT INTERFACE WITH ENHANCED PROGRAMMABLE DIRECT PORT

(75) Inventors: Raymond Chow, Richmond (CA); Yun Shon Low, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 1233 days.

(21) Appl. No.: 11/935,096

(22) Filed: Nov. 5, 2007

(65) Prior Publication Data

US 2009/0119428 A1    May 7, 2009

(51) Int. Cl.
G09G 5/00   (2006.01)
(52) U.S. Cl. ............... 345/204; 345/55; 345/690; 710/1
(58) Field of Classification Search ............... 345/204, 345/55, 690; 710/1
See application file for complete search history.

(56) References Cited

U.S. PATENT DOCUMENTS

| | | | |
|---|---|---|---|
| 4,302,010 A * | 11/1981 | Kaenel | ............................. 473/70 |
| 4,481,570 A | 11/1984 | Wiker | |
| 6,195,734 B1 | 2/2001 | Porterfield | |
| 6,886,089 B2 | 4/2005 | Fernald et al. | |
| 7,039,735 B2 | 5/2006 | Hunt et al. | |
| 2002/0018395 A1 | 2/2002 | McLaury | |
| 2002/0099917 A1 | 7/2002 | Sato et al. | |
| 2003/0014474 A1 * | 1/2003 | McKaig et al. | ............... 709/108 |
| 2003/0067456 A1 | 4/2003 | Low et al. | |
| 2003/0120890 A1 | 6/2003 | Bae | |
| 2005/0030313 A1 | 2/2005 | Radke et al. | |
| 2006/0090018 A1 | 4/2006 | Chow et al. | |
| 2008/0005222 A1 * | 1/2008 | Lambert et al. | ............... 709/203 |

FOREIGN PATENT DOCUMENTS

| | | |
|---|---|---|
| EP | 0121373 A2 | 10/1984 |
| EP | 0121373 B1 | 10/1984 |
| EP | 0461623 A1 | 12/1991 |
| EP | 0917048 A2 | 5/1999 |
| EP | 1691549 A1 | 8/2006 |
| JP | 62-151955 A | 7/1987 |
| JP | 3-185536 A | 8/1991 |

* cited by examiner

Primary Examiner — Nitin Patel
Assistant Examiner — Leonid Shapiro
(74) Attorney, Agent, or Firm — Mark P. Watson (57) ABSTRACT

Device, apparatus and methods for implementing a direct address mode to directly access registers by passing an indirect interface includes a display controller. A plurality of direct access registers for bypassing indirect interface is defined within the display controller. The display controller includes a bus interface having a first pin that is configured to activate the direct address mode and a second pin that configured to identify one of the direct access registers. The first pin in conjunction with the second pin provides a direct address mode through which the non-direct access registers may be directly accessed bypassing the indirect interface so that register index cycle, when accessing memory, may be avoided.

23 Claims, 11 Drawing Sheets

| A1 | A0 | D/C# | CS# | Action |
|---|---|---|---|---|
| x | x | x | 1 | No Access |
| 0 | 0 | 0 | 0 | Index Access |
| 0 | 0 | 1 | 0 | Data Access |
| 0 | 1 | 0 | 0 | Reg. # 1 Access |
| 0 | 1 | 1 | 0 | Reg. # 2 Access |
| 1 | 0 | 0 | 0 | Reg. # 3 Access |
| 1 | 0 | 1 | 0 | Reg. # 4 Access |
| 1 | 1 | 1 | 0 | Reg. # 5 Access |

METHOD AND APPARATUS FOR INDIRECT INTERFACE WITH ENHANCED PROGRAMMABLE DIRECT PORT

BACKGROUND

1. Field of the Invention

This invention relates generally to computer systems and more particularly to providing direct address mode bypassing an indirect interface to access registers in the computer system.

2. Description of the Related Art

A computer system includes a plurality of semiconductor chips serving different functions. These semiconductor devices typically contain a host interface to allow communication between the various semiconductor devices such as microcontroller, microprocessors, other peripheral devices, etc. Microcontrollers, such as display controllers, support an indirect addressing mode when communicating through a host interface. The indirect addressing mode requires a read/write enable signal, chip select signal, register select signal, and a data bus. An indirect addressing mode using an indirect interface provides many advantages over a direct addressing mode using a direct interface. Some of the advantages include use of fewer pins to communicate, resulting in a less complex printed circuit board (PCB) layout, minimal electromagnetic interference (EMI) and less power consumption. The advantages are, however, offset by some disadvantages, which include increased processing time due to formatting of the data on the host side, protocol preparation and increased access latency. This is due to the fact that the indirect interface communicates through a protocol, which typically requires two accesses to read from/write to a register location, 1) an index cycle and 2) a data cycle. The index cycle sets up an address pointer to the register to be accessed in the internal memory of a microcontroller, while the data cycle reads from or writes data to that specified register. In addition, accessing non-consecutive areas of memory requires additional index and data cycles to access the memory address register and the memory data register resulting in further decrease in the throughput.

As the semiconductor devices increase in complexity with new features and functionalities, the disadvantages are becoming more of a concern. For instance, in a mobile device, such as cell phone, a base processor is heavily burdened handling several functions of varying priorities including communication with semiconductor devices within the mobile device, using an indirect interface. In such devices, increased cycles to access memory results in increased processing time which directly relates to decreased efficiency, decreased response time and increased latency.

It is, therefore, advantageous to address interface efficiency due to indirect addressing so that the base processor may efficiently manage the communication between various components/modules with a potential loss of data or data corruption.

SUMMARY

Broadly speaking, the present invention fills these needs by providing a method and apparatus for implementing a direct address mode bypassing an indirect interface. It should be appreciated that the present invention can be implemented in numerous ways, including as a method, a system, or a device. Several inventive embodiments of the present invention are described below.

In one embodiment, a display controller for implementing a direct address mode bypassing an indirect interface to directly access registers within the device is described. A plurality of direct access registers for bypassing indirect interface is defined within the display controller. The display controller includes a bus interface having a first pin that is configured to activate a direct address mode and a second pin that is configured to identify one of the direct access registers. The first pin in conjunction with the second pin provides a direct address mode through which the registers may be directly accessed thereby avoiding register index cycle of the indirect interface.

In another embodiment, a method for implementing a direct address mode bypassing an indirect interface to directly access registers within a display controller is provided. The method initiates with receiving a control signal from a host controller through a bus interface associated with the host controller. The status of the control signal is examined to determine if direct address mode is activated. Access to one of a plurality of registers is enabled through one of a plurality of direct access registers based on the status of the control signal. The data associated with the register is processed without incurring a register index cycle.

In another embodiment, a device to implement direct address mode bypassing an indirect interface to directly access registers within the device is provided. The device includes a host controller to provide a control signal using a bus interface. The device further includes a display controller configured to communicate with the host controller. The display controller includes an indirect interface module that is configured to decode and route the control signal received from the host controller. The indirect interface module includes address decode logic module and a bypass logic module to decode and route the control signals. The address decode logic module is configured to determine the type of access requested by the control signal and the bypass logic module is configured to enable access to one of a plurality of direct access registers defined within the display controller. Each of the direct access registers is configured to map to a non-direct access register. The device also includes a selection circuitry configured to select output from one of the plurality of direct access registers based on output from a bypass logic available to the display controller. The bypass logic together with selection circuitry avoids a register index cycle of the indirect interface.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 4A-4C represent wave form diagrams for the various signals when using an indirect addressing scheme.

DETAILED DESCRIPTION

An invention is described for method, an apparatus and device that supports a direct address mode bypassing an indirect interface to access registers of a display controller. It will be obvious, however, to one skilled in the art, that the present invention may be practiced without some or all of these specific details. In other instances, well known process operations have not been described in detail in order not to unnecessarily obscure the present invention.

The embodiments of the present invention provide methods, an apparatus and a device that enables reduction in the amount of bus cycles required to access registers of a display controller using a direct address mode. The feature, described in more detail below, allows access to direct access registers by bypassing an indirect interface so that additional register index cycles associated with the indirect interface may be avoided. This feature is enabled by the use of at least two pins. The first pin is configured to indicate the type of access requested by the host controller based on logical levels of a first signal on the first pin and the second pin is configured to identify the appropriate register/register address requested based on logical level of a second signal on the second pin. For example, the first pin may be configured such that if the first signal on the first pin is in a first logical state, then the type of access requested is a direct bypass mode and if the first signal on the first pin is in a second logical state, then the type of access requested is an indirect address mode. When the first signal on the first pin is in the first logical state, the logical state of a second signal on the second pin will determine which direct access register is to be accessed in the direct address mode. The second pin may be configured such that access is provided to the appropriate register based on the logical state of the second signal. In the case where the first pin indicates an indirect address mode, the second signal will provide access to the register index of an appropriate register in the display controller. Thus, the first pin in conjunction with the second pin can provide access to a direct access register when the direct address mode is activated saving extra register index cycles.

The first pin and the second pin may be dedicated pins that are configured to provide direct access to one of the direct access registers defined within the display controller 200 using a direct address mode. Alternatively, a pair of unused pins, i.e., ones that are not allocated when the chip is configured in indirect mode or pins that have alternate functions already defined, may be utilized as the first and second pin. These pins may be configured to operate in 2 alternate modes: 1) an active direct address mode when the first pin is pulled high or 2) in an alternate function mode, such as an indirect address mode, when the first pin is pulled low. When the first pin is pulled low, the chip would behave either as having a conventional indirect interface or a chip without direct address mode. Thus, the first pin could be left unconnected (floating) and the registers may still be accessed indirectly under a conventional indirect addressing scheme.

Figure 1:
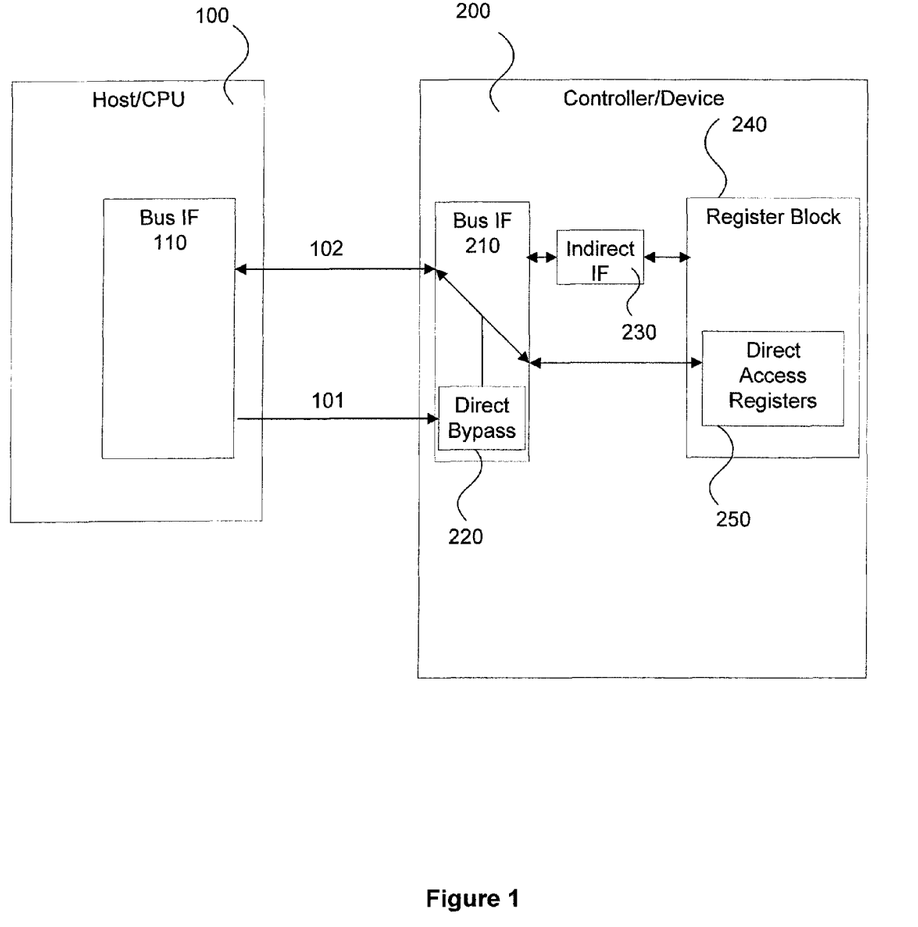
FIG. 1 represents a block diagram of a device with a direct bypass module co-located with the indirect interface within a display controller in accordance with one embodiment of the invention.

FIG. 1 is a simplified block diagram of a device having a direct bypass module to enable direct access to a plurality of direct access registers defined within the display controller, in one embodiment of the invention. The device includes a host controller or CPU 100 with a bus interface 110 to communicate with a microcontroller, such as display controller 200. In one embodiment, display controller 200 is a liquid crystal display controller. However, display controller 200 may be any display controller and may also be referred to as a graphics controller or mobile graphics engine. The display controller 200, in turn, includes a bus interface 210 that communicates with the host controller bus interface. The display controller bus interface 210 includes a direct bypass module (otherwise referred to as direct access module) 220 to provide access to a plurality of direct access registers 250 within the display controller 200. In addition to the direct bypass module 220, the display controller 200 includes an indirect interface 230 to allow execution of indirect address scheme.

The display controller bus interface 210 receives a control signal from the host controller bus interface 110 and evaluates the type of access requested by the control signal. A typical control signal may be an aggregation of a plurality of signals from a plurality of pins including a chip select (CS#) signal from a chip select pin, a data/control (D/C#) signal from a data/control pin, a write enable signal from a write pin, a read signal from a read pin and a data bus signal from a data bus pin. In addition to signals from the aforementioned pin, the control signal may include a signal from an auxiliary pin, A0, to define the type of access requested. If the signal from the auxiliary pin identifies a direct bypass mode (also referred to as direct address mode), then the direct bypass module 220 decodes and activates a direct bypass path to the appropriate direct access register 250 defined within the display controller. If the signal from the auxiliary pin identifies an indirect addressing mode, then the indirect interface 230 identifies an appropriate register in the display controller 200 using a register index cycle that provides the address of the register to be accessed and then a separate data cycle to read from/write to the identified register. In one embodiment, the direct access registers 250 and the remainder of the registers is all defined within a register block 240 within the display controller 200. However, one skilled in the art will appreciate that the registers (including the direct access registers) may be distributed throughout display controller 200.

The control signal from the host controller to the device controller includes signals from at least two pins, in one embodiment of the invention. Continuing to refer to FIG. 1, line 101 from the host controller 100 to the device controller 200 represents a request for direct address mode based on a particular logical level of a first signal from a first pin. As the request for direct address mode is for providing access to direct access registers 250 residing in the device controller 200, line 101 is represented by a uni-directional arrow indicating the direction of flow of request. Line 102 from the host controller 100 to the device controller 200 indicates data transmission. As the data can be transmitted between the host controller and the device controller in any direction depending on a read or write cycle, line 102 is represented by a bi-directional arrow. Although the current embodiment illustrated in FIG. 1 includes a single pin to provide the signal for a direct address mode, multiple pins could be used to provide signals to indicate direct address mode. It should be noted that the number of pins allocated for identifying direct address mode determines the number of direct access registers that are accessible using the direct address mode, as discussed in more detail below.

Figure 2:
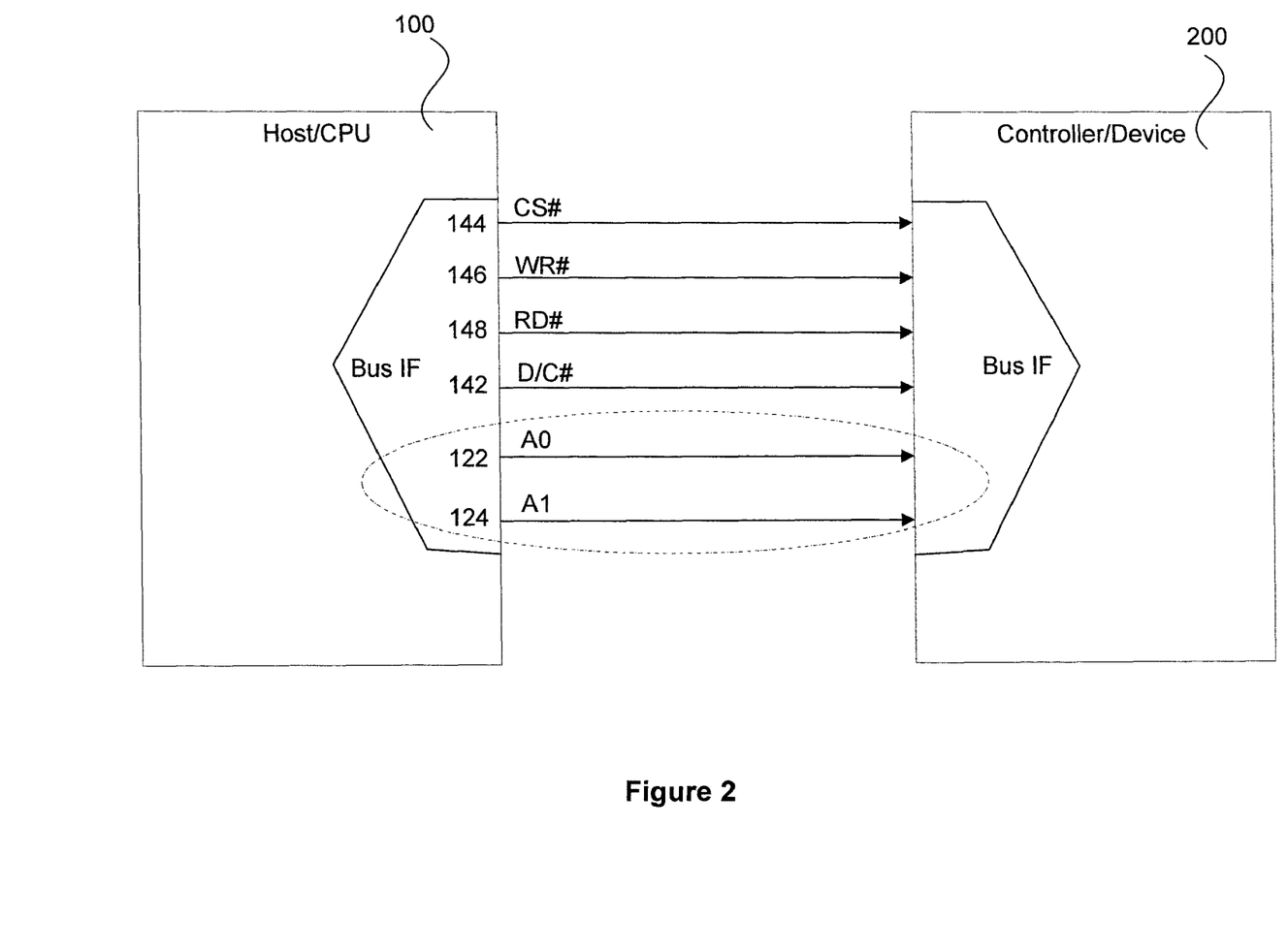
FIG. 2 is a simplified schematic diagram of a device with pin configuration for implementing direct address mode between a host controller and a display controller in one embodiment of the invention.

FIG. 2 is a simplified schematic diagram of a device having a pin configuration for supporting a direct address mode between a host controller 100 and a display controller 200, in accordance with one embodiment of the invention. The host controller 100 includes pins 142, 144, 146, 148, 122 and 124 for communicating control signal to the display controller 200. Pin 144 is configured to support a chip select (CS#) signal. Pin 146 is configured to support a write enable signal while pin 148 is configured to support a read signal. An auxiliary pin A0 122 is configured to enable the direct address mode. As mentioned earlier, more than one auxiliary pin may be used to access direct access registers and the number of auxiliary pins determines the number of direct access registers that may be defined for direct access. The number of direct access registers that can be accessed using one or more auxiliary pins is determined by a formula $(2^{n+1}-3)$, where 'n' is the number of auxiliary pins used. In the embodiment illustrated in FIG. 2, an additional auxiliary pin A1 124 is provided to augment the number of direct access registers that can be accessed. In this embodiment, a total of five direct access registers may be accessed using the combination of the auxiliary pins A0 122 and A1 124. Pin 142 is configured to support a data/control (D/C#) signal which is used to identify the appropriate register defined within the display controller 200 based on the status of the auxiliary pin(s). A data bus (not shown) enables data transmission between host controller 100 and display controller 200. The width of data bus may be any suitable bit size, e.g., 8 bits, 16 bits, 32 bits, etc. A set of complementary pins are provided on the display controller side to receive/transmit corresponding signals from/to the host controller 100.

A signal from auxiliary pin A0 122 is used internally by bypass logic associated with the direct bypass module 220 to discriminate between the two types of register accesses, i.e., direct address mode and an indirect address mode. In one embodiment, a designer of the device may configure the bypass logic such that direct address mode is activated when the signal on the A0 122 pin is pulled high and an indirect address mode when the signal on the A0 122 pin is pulled low. Other ways of defining the bypass logic may be employed so long as the functionality of the feature is not compromised.

In order to implement direct address mode without adding additional overhead or due to some design constraints for a bus interface where additional pins cannot be accommodated or is not desired, one or more existing general purpose input/output (GPIO) pins may be used to implement the direct address feature. In one embodiment, one or more GPIO pins are programmed to perform the function of the auxiliary pin A0 122 (and additional auxiliary pins A1 124, etc.). By using the existing GPIO pins, the redesign of the bus interface (IF) for additional pins is avoided. Further, when the direct address mode is not activated, the existing GPIO pins may be used for alternate functions, such as communicating using an indirect interface or any other function for which the GPIO pins were designated.

Figure 3:
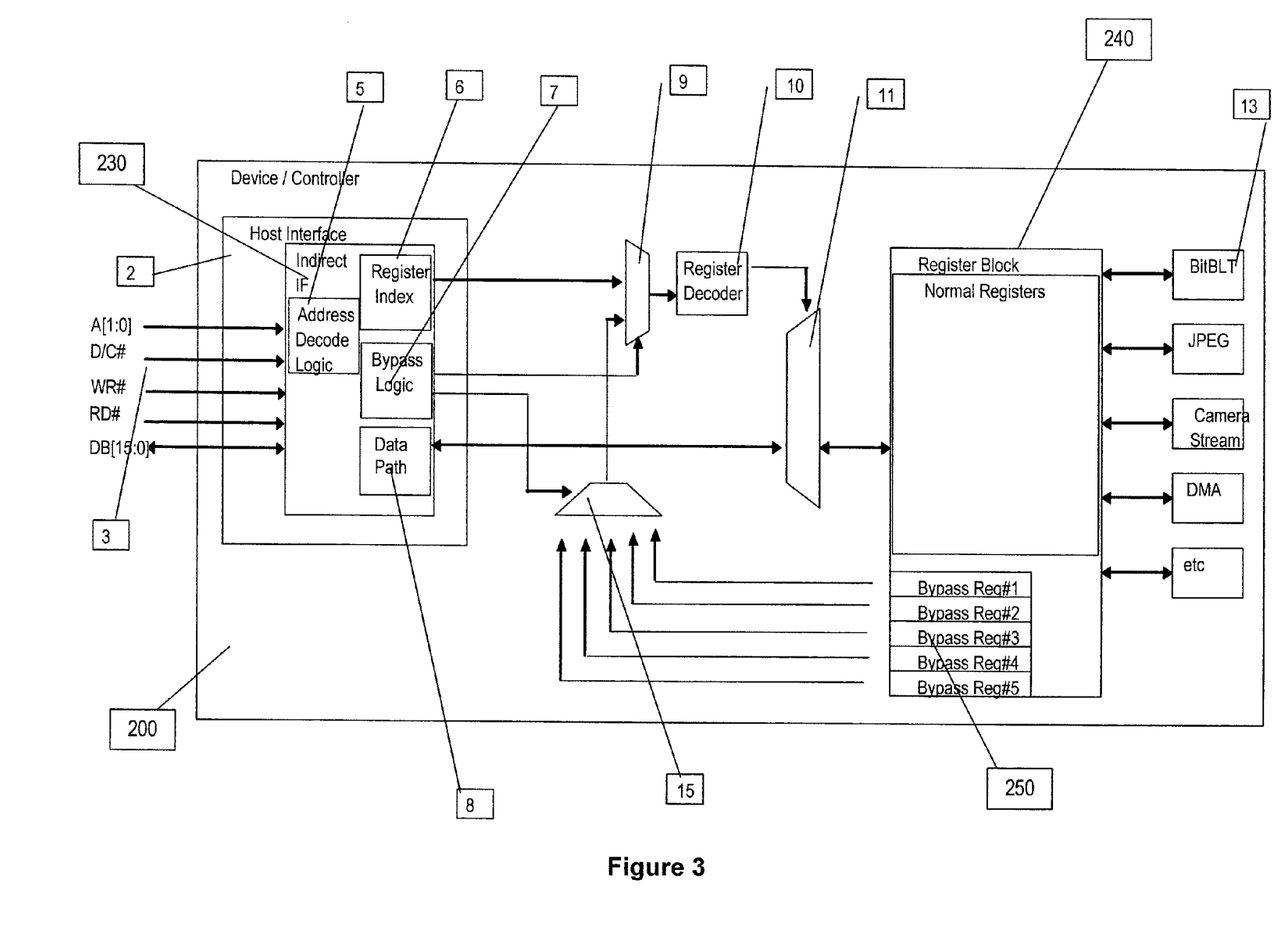
FIG. 3 is a simplified schematic diagram of the layout of various modules and components within the display controller, in accordance with one embodiment of the invention.

The direct address feature works effectively using various modules within the device controller. These modules may be existing modules or newly created to support the implementation of the direct address feature. FIG. 3 illustrates the specific modules involved in providing the direct address feature. To start with, a host controller 100 originates a control signal 3. The control signal 3 may be triggered by an interrupt, such as a First-in-first-Out (FIFO) interrupt, which the host controller 100 has to manage in addition to managing various other functions/modules. These FIFO interrupts are fairly common in a device as the host controller manages a host of sub-modules including device controller and other microcontrollers which all require processing, polling, interrupt handling, etc. These interrupts are time-critical interrupts that have to be effectively and efficiently managed in order to avoid loss of data at the display controller.

The control signal 3 from the host controller 100 is received at the bus interface 2 of the device controller 200. The bus interface 2 includes an indirect interface module 230 and a direct bypass module. As mentioned earlier, the control signal 3 includes a chip select signal to identify the particular chip (device controller) selected. The control signal also includes a signal from an auxiliary pin A0 122. The signal from the auxiliary pin A0 122 will identify a direct address mode or an indirect address mode based on a logical level of the signal from the auxiliary pin A0. The control signal also includes a data/control signal to indicate a register index to either a non-direct access register or a direct access register. When the control signal 3 is received at the device controller 200, address decode logic 5 within the bus interface 2 will decode the control signal 3 to identify the type of access requested. Once the address decode logic 5 identifies the type of access requested, the control signal is transmitted to a register index module 6 if the type of access requested is an indirect address mode or to bypass logic 220 within the direct bypass module 7 if the type of access is a direct address mode.

When the type of access requested is a direct address mode, the bypass logic 220 decodes the control signal 3 to identify a specific direct access register from a plurality of direct access registers 250 defined within the device controller 200. A register block 240 within the device controller 200 includes a plurality of non-direct access registers along with a plurality of direct access registers 250. The plurality of direct access registers 250 are defined by a host controller 100 based on the number of auxiliary pins available for direct address mode. The bypass logic 220 within the bypass logic module 220 identifies and activates a direct bypass path to a specific direct access register 240 using a multiplexer 15 (Mux-for-the-Bypass registers). The identified direct bypass path is used during a read or write operation to directly access the register content for the appropriate direct access register 250. The multiplexer 15 transmits the identified direct bypass path to a second multiplexer (Mux-to-Register-Decoder) 9. The data from or to the appropriate direct access register 250 within a register block 240 is transmitted using a data path 8.

When the type of access requested is an indirect address mode, the register index module stores the incoming data from the host controller as a register index and forwards the register index to the multiplexer 9 (Mux-to-Register-Decoder). Multiplexer 9 is controlled by the signal (that identifies an indirect address mode) from the bypass logic 220 of the bypass logic module 7 and uses the register index from the register index module 6 to identify one of the non-direct bypass registers in the register block 240. A register decoder module 10 is used to decode the register index/bypass path received at the multiplexer 9 from either register index 6 or the multiplexer 15 (Mux-of-the-bypass-register). A third multiplexer 11 (Mux-to-register-block) selects the correct register in the register block 240 for reading data from or writing data into. The device controller 200 also includes a plurality of sub-modules 13, such as Bit Block transfer (BitBLT) module, Joint Photographics Expert Group (JPEG) module, Camera Stream module, Direct Memory Access (DMA) module, etc., which have their own First-in-first-out memory stack (FIFOs) and interrupts. The host controller 100 manages these sub-modules including writing to FIFOs, interrupts, polling, etc., and may use the same direct address feature to service time-critical interrupts. It should be noted that when the type of access requested is an indirect address mode, the direct access registers defined within the display controller may be inactivated. Thus, the direct access registers may switch between an active state and an inactive state based on the requested access type.

As used herein direct access registers and non-direct access registers are standard registers. However the direct access registers have specific functions that are different from the non-direct access registers. The non-direct access registers provide access to data or register indices. The direct access registers provide direct bypass access functionality by storing register indices of non-direct access registers so that the indirect address mode may be bypassed.

Figure 4A:
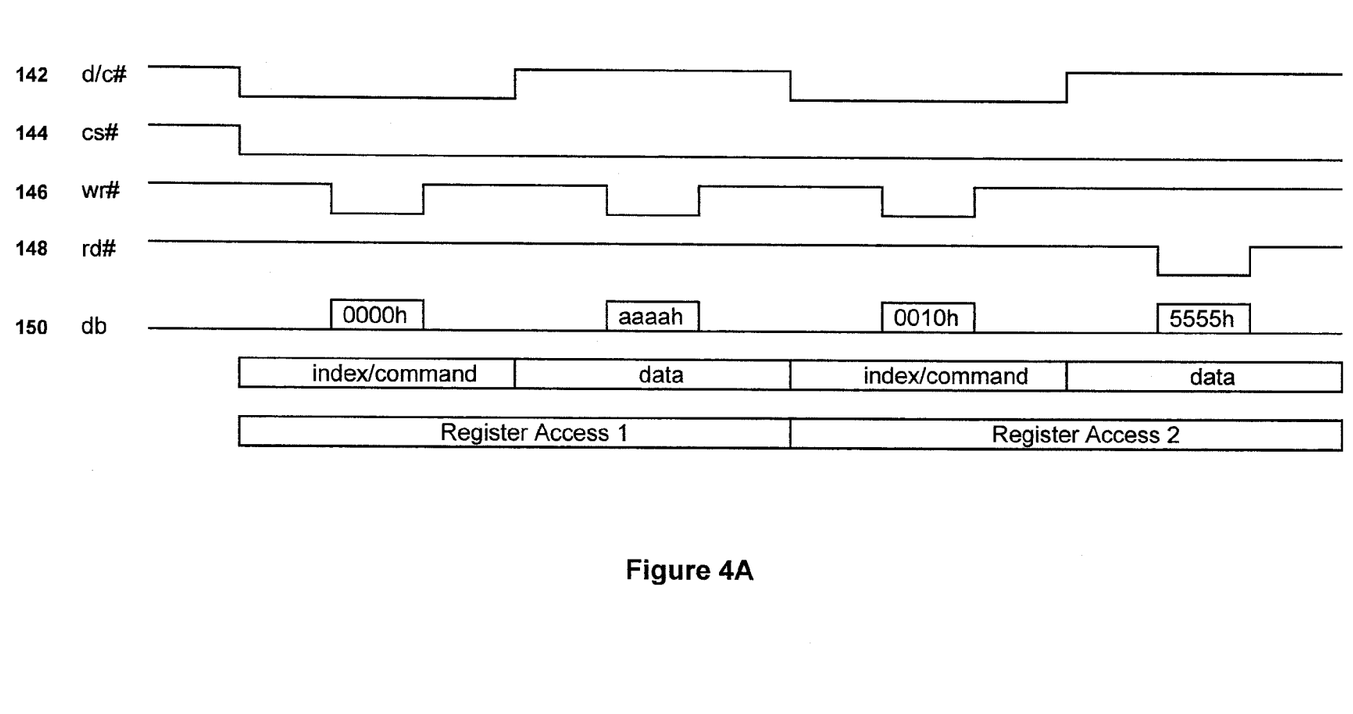
FIG. 4A represents the waveform for a typical register write and register read.
Figure 4B:
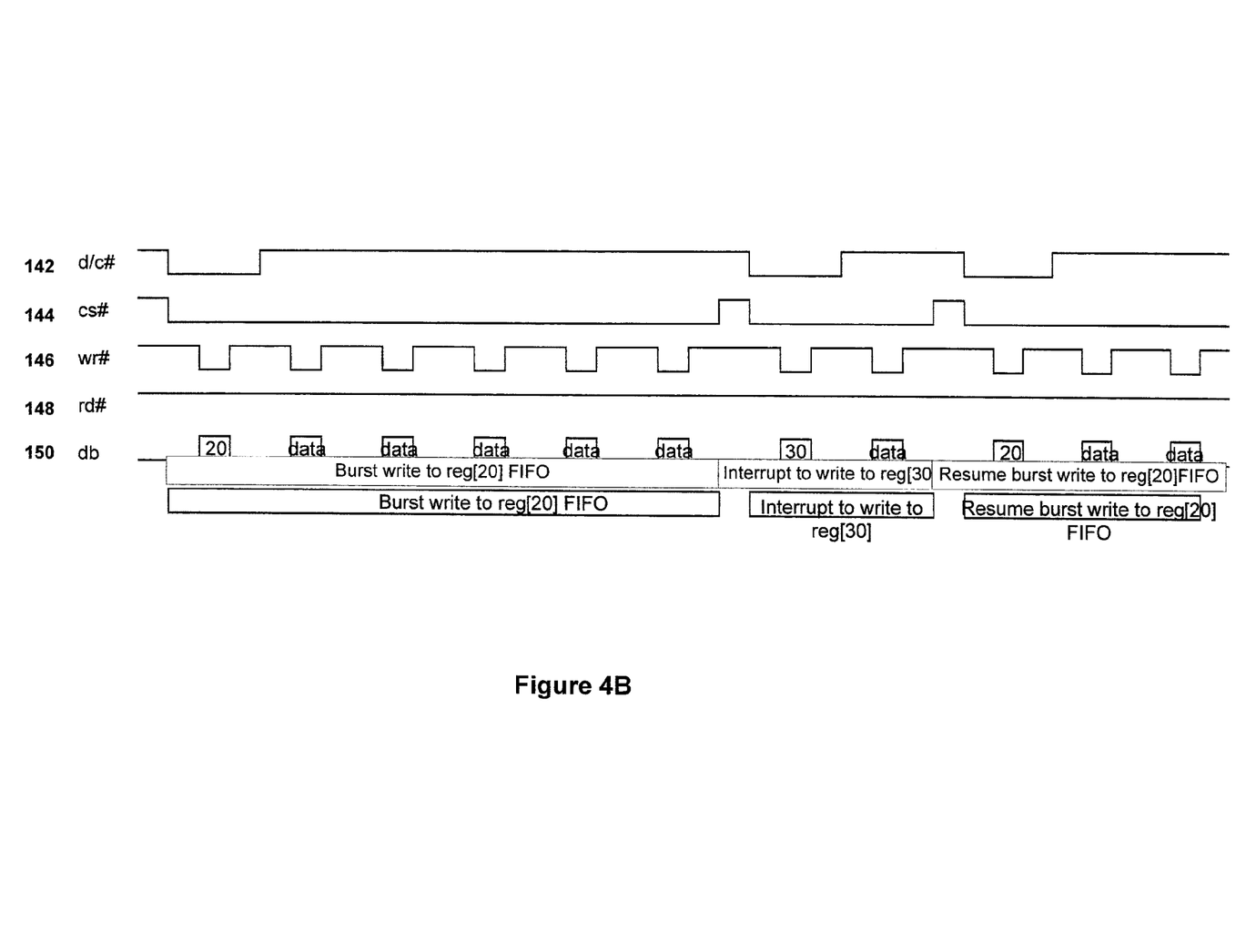
FIG. 4B represents the waveform for a register burst write with interruption.
Figure 4C:
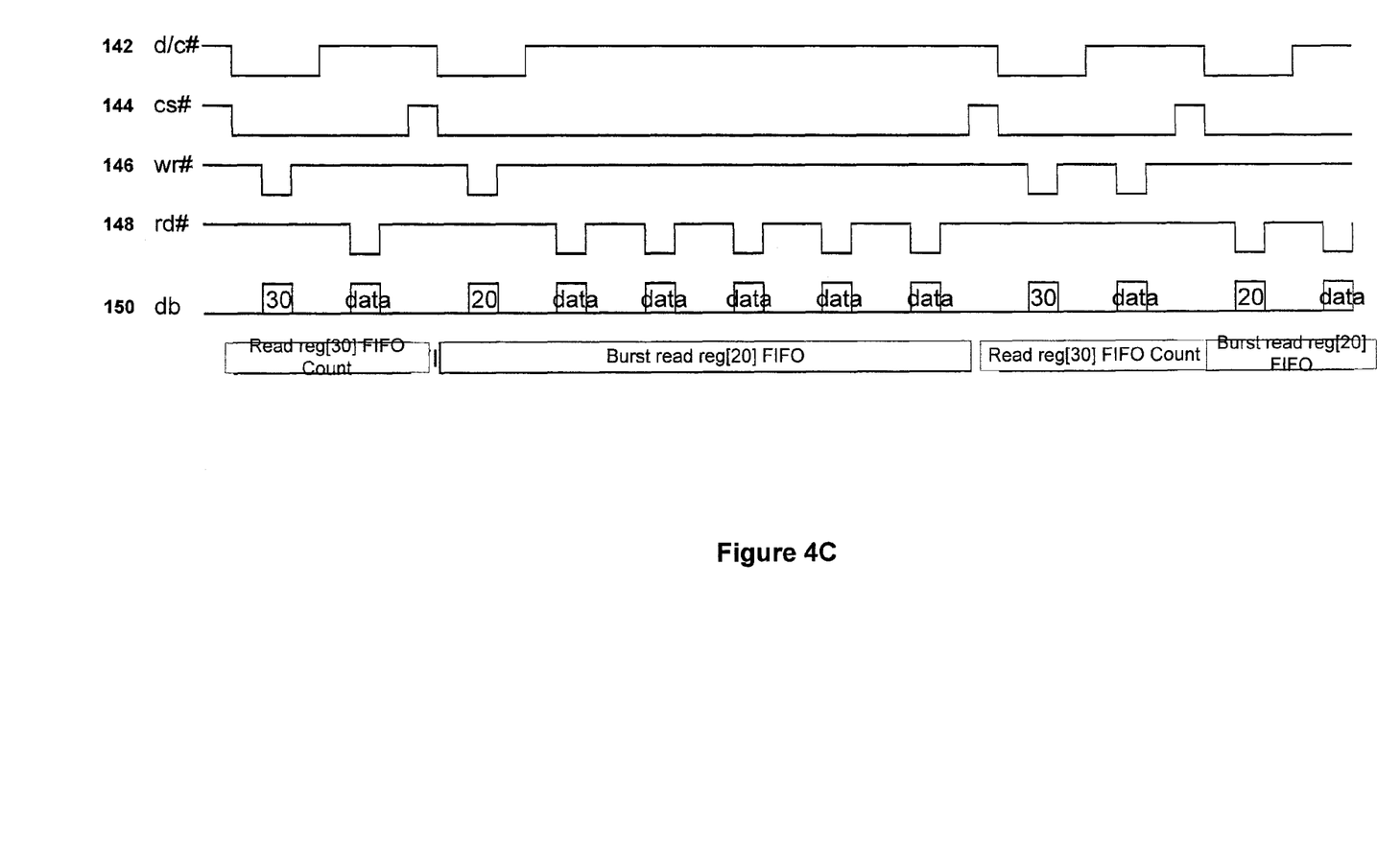
FIG. 4C represents the waveform for a register burst read with interruption.

FIGS. 4A through 4C illustrate waveform diagrams for the various signals within a control signal received from a host controller for an indirect address scheme. Signal 142 represents a data/control (D/C#) signal that identifies a register index or data. Signal 144 represents a chip select signal. Signal 146 and 148 represent a write enable signal and read signal, respectively. Signal 150 represents data being sent on a data bus. As indicated, when D/C# signal is low, a register index command is indicated for a first access of the registers in the register block. In this embodiment, an auxiliary pin signal is not yet defined. The chip select signal 144 is pulled low to indicate the current chip selected for this operation. The write enable signal 146 is first pulled high until data is encountered, at which time the write enable signal 146 is pulled low. The write enable signal together with the D/C# signal identifies the data as a register index to a register within the register block. In the embodiment illustrated in FIG. 4A, in the first cycle, the D/C# signal is pulled low indicating a register index cycle wherein the register index is identifying register 0. The write enable signal is pulled low to indicate a write operation is occurring. In the subsequent cycle, the D/C# signal is pulled high to indicate a data cycle. The data value, "aaaah", received through the data cycle is written to the identified register 0. After the write operation, the write enable signal is pulled high. The next cycle is a read cycle wherein a different register is identified and data from the identified register is read. In the embodiment illustrated in FIG. 4A, register 10 is accessed using a second register index cycle and data "5555h" is read in a subsequent data cycle. FIG. 4A illustrates a typical indirect register write and register read being executed using separate register index cycles and data cycles. As can be seen, every time data is to be read or written to, a register index cycle is first executed to identify the appropriate register, followed by the appropriate data cycle. This increases processing time and adds to the latency at the display controller.

FIG. 4B illustrates a waveform representation of a sequential burst register access interrupted by a single register access. As can be seen, the host controller is burst writing 5 writes to register 20 using a register index cycle and a series of data cycles. At this time, an interrupt occurs. In cases where multitasking operations are occurring, if the interrupts are not processed in a timely fashion, corruption of data may occur which may manifest on the display screen when the data is on display real-time. On the other hand, when data is stored in a buffer and an interrupt is not handled in a timely fashion, a frame may have to be dropped (due to loss of data) when rendering the buffered data on a display screen of a display controller. It is, therefore, essential to service the interrupts promptly so that the host controller can manage the various modules/sub-modules efficiently and optimally without loss or corruption of data.

Referring back to FIG. 4B, a data/control (D/C#) signal 142 is pulled low indicating a register index command. The databus (db) 150 identifies the register index that is being accessed using the D/C# signal. In the following sequence of cycles a write burst occurs wherein the write enable signal 146 is pulled low indicating a write operation command at which time the data from the db 150 is used in writing to register 20. During the write burst operation, an interrupt occurs. The interrupt results in the transmission of a register index cycle to identify register 30 which is the target of the interruption by pulling the D/C#142 signal low and a data cycle to write to register 30 by pulling the write signal 146 low. The original write operation is resumed by the transmission of another register index cycle to identify the original register (register 20) and the write burst to register 20 continues. During this sequential burst register access process, extra index cycles to identify registers 30 (interrupt target) and 20 (resumption point) cause an overhead adding to the latency at the device controller.

FIG. 4C illustrates a waveform representation of a signal for a non-sequential register burst read operation with interruption. Typical servicing of a FIFO buffer is made possible by using indirect interface. In the first cycle, the FIFO is read first to determine the amount of data within the FIFO that needs to be written or read. In this case, the first cycle includes a first data that indicates a register index to register 30. The data from the next cycle includes information about the amount of data in the FIFO register that needs to be written or read, which in this case indicates a count of 5. In the following cycle, a register index cycle is executed to identify register 20 to which the data is to be written to or read from. In the following sequence of cycles register 20's content is read to obtain the data indicated by the FIFO count obtained from register 30, which includes 5 pieces of data. The FIFO count is read again asynchronously from register 30 using register index cycles and data cycles and the process continues. Due to the fact that data is streaming continuously, the first read from register 30 will not yield the full count of data pieces to be read and, hence, the FIFO count has to be read and re-read. The register index cycles for reading from register 30 to obtain the FIFO count, then from register 20 to obtain the corresponding number of data, and back again to register 30 lead to overhead in the processing cycle of the device controller. It should be appreciated that the additional register index cycles add to the latency observed at the device controller.

Figure 5A:
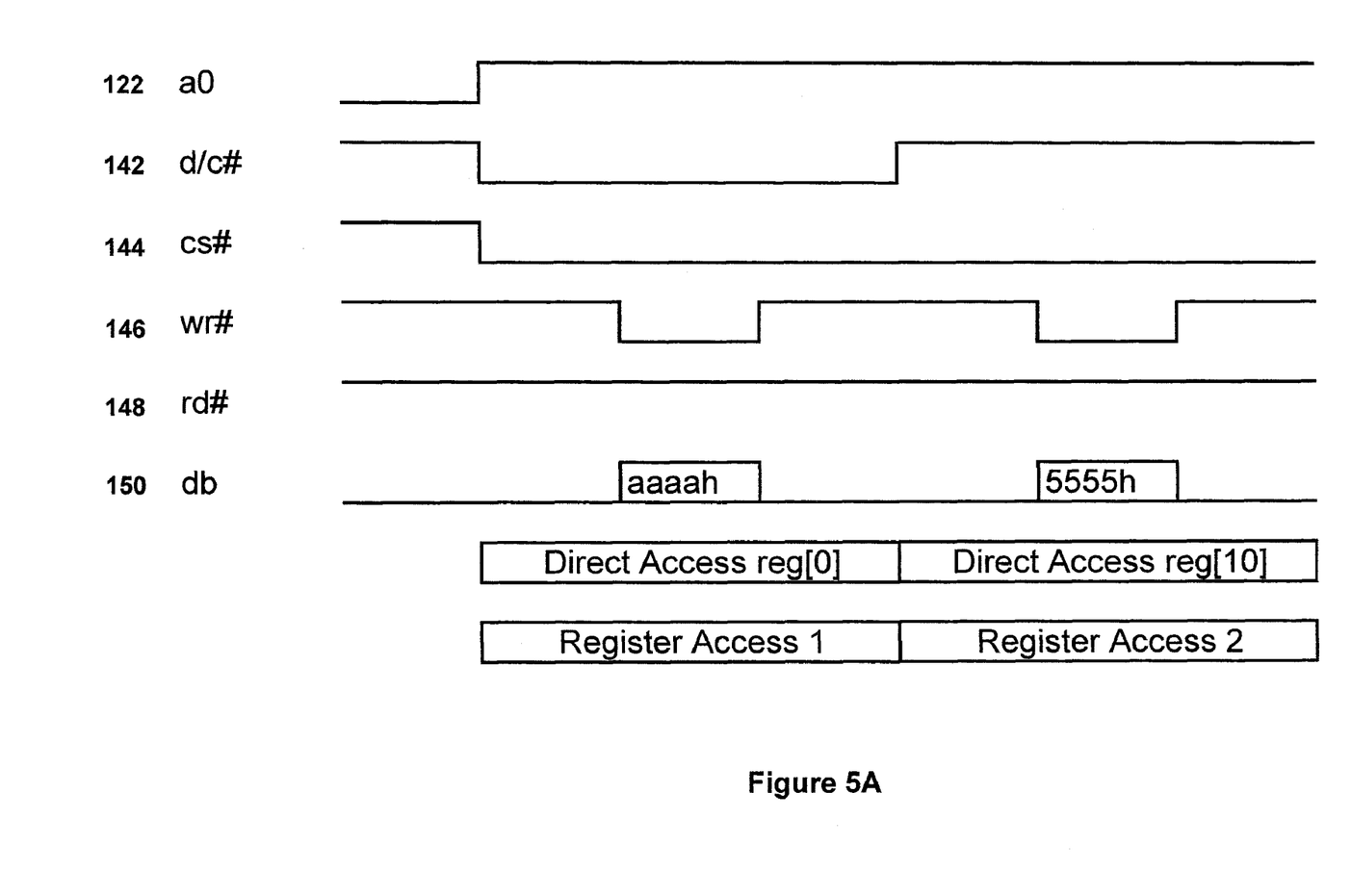
FIGS. 5A-5C represent wave form diagram corresponding to the wave form diagrams illustrated in FIGS. 4A-4C but using a direct address mode, in accordance with one embodiment of the invention.
Figure 5B:
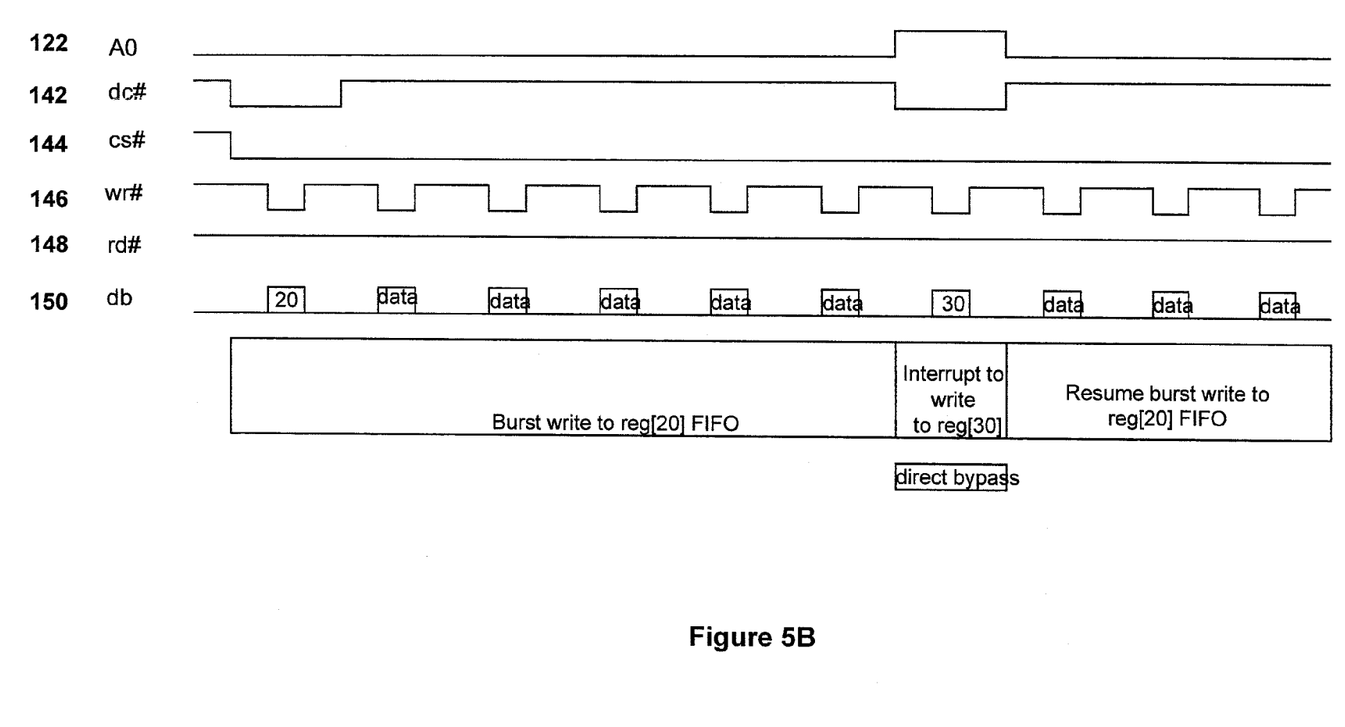
Figure 5C:
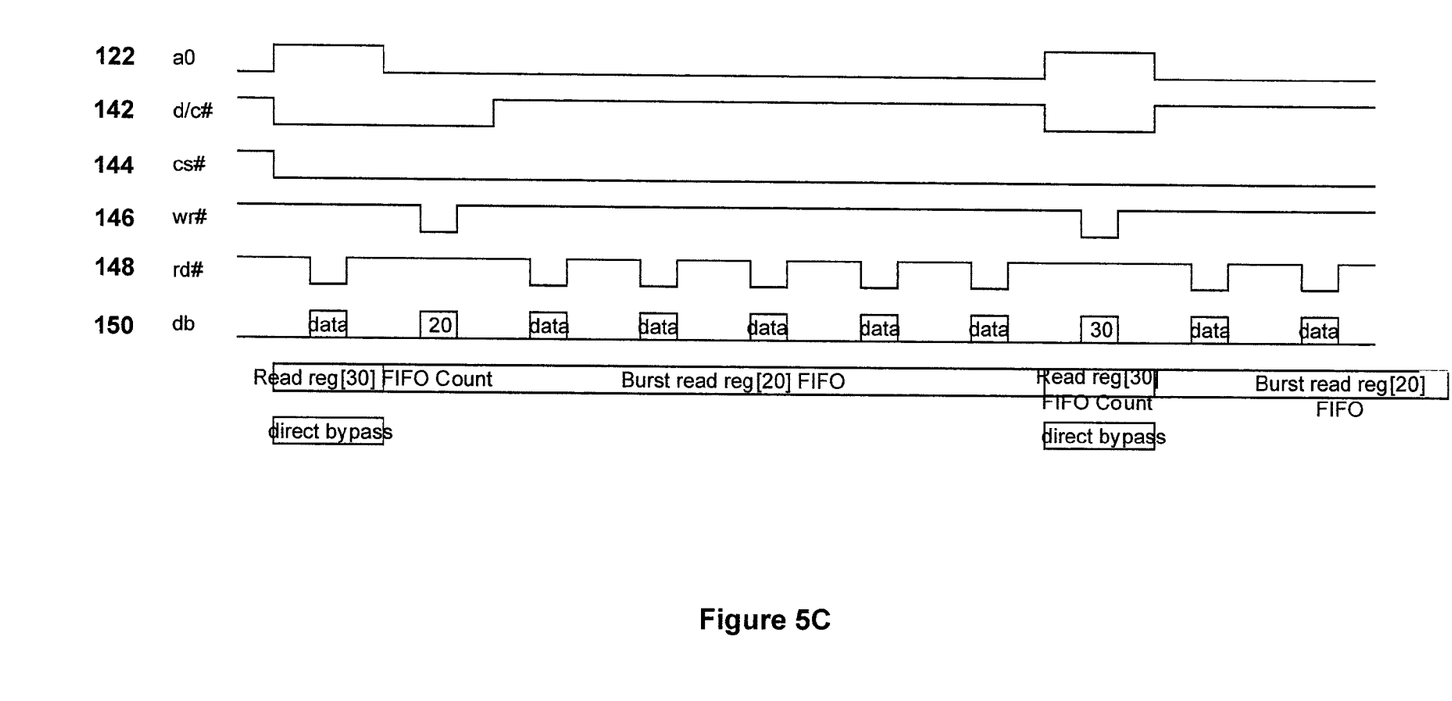

FIGS. 5A through 5C illustrate waveform representation of a control signal configured with a direct bypass feature, in accordance with one embodiment of the invention. In this embodiment, in addition to the traditional signals from a chip select pin (signal 144), data/control pin (signal 142), read access pin (signal 148), write enable pin (signal 146) and a data bus pin (150), the control signal includes a signal from at least an auxiliary pin A0 122. It should be noted that the control signal is not restricted to a single auxiliary pin but might include signals from a plurality of auxiliary pins. The signal from the auxiliary pin 122 is decoded to determine the type of access requested. A developer of a chip, at design time, may include logic to define the type of access based on the logical level of the signal from the auxiliary pin A0 122. Accordingly, in one embodiment, when the signal from the auxiliary pin A0 122 is low, an indirect address mode is enabled and when the logical level of the auxiliary pin signal is high, a direct address mode is enabled. The logic may be in the form of software or hardware, i.e., logic gates or some combination or both or may use other forms. The data/control# (D/C#) signal 142 is indicative of a register access to one of the direct access registers when the signal from the auxiliary pin(s) indicates a direct address mode. The D/C# signal 142 indicates the first register access to one of the direct access register when pulled low and a second register access to a different direct access register when pulled high when the direct address mode is enabled. Thus, in this embodiment a single D/C# signal along with a single auxiliary pin A0 122 can be used to differentiate between two direct access registers. In another embodiment, multiple auxiliary pins in combination with a D/C# signal may be used for selecting between more than two direct access registers.

The waveform illustrated in FIG. 5A depicts two consecutive register writes using two write cycles compared to the 4 write/read cycles illustrated in FIG. 4A. In this embodiment, the additional overhead of register index cycles is avoided by using a direct address mode that bypasses the Indirect addressing scheme. The processing of the control signal is similar to the one described with reference to FIG. 4A. The control signal is received at an address decode logic module at the device controller bus interface and decoded to identify the type of access requested by examining a logical level of a signal from the auxiliary pin A0. If more than one auxiliary pin is used, then the logical levels of all the auxiliary pins are examined to determine the type of access requested. Once the type of access is determined, the control signal goes through the appropriate modules to be decoded and the corresponding register is identified. Details of the various modules used in decoding the control signal and their functional role has already been explained with reference to FIG. 3 and for the sake of brevity, is not further covered herein.

Figure 6:
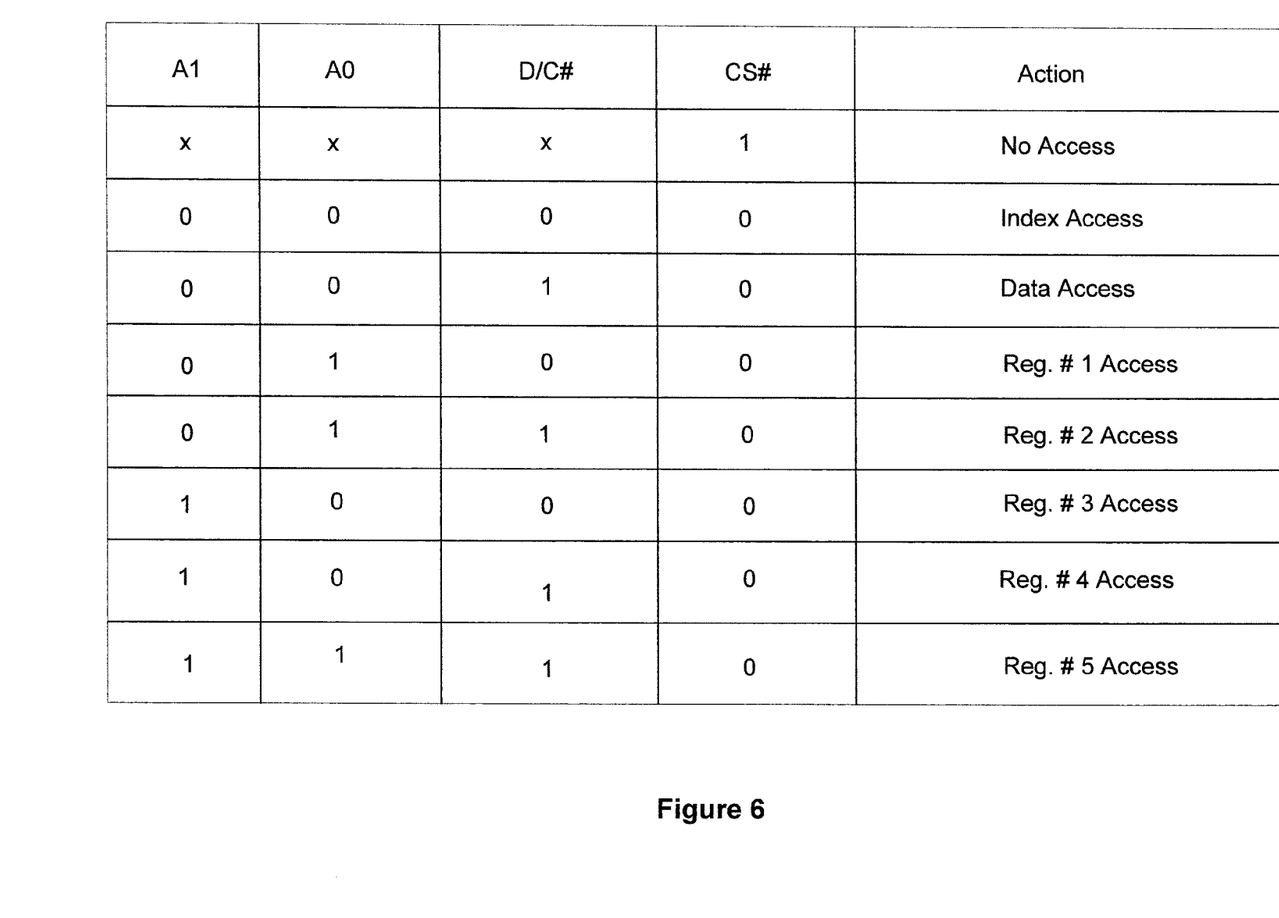
FIG. 6 is a truth table identifying the various registers that are accessed using the direct address mode, in one embodiment of the invention.

As indicated earlier, in addition to the examination of signals from one or more auxiliary pins, the data/control# (D/C#) signal and the chip select signal are also examined. The chip select signal identifies the chip that is currently being used. In the case where the direct address mode is implemented, the D/C# signal does not signify data or a register index but is used as a decoder to identify the appropriate bypass register. In the waveform illustrated in FIG. 5A, as only one auxiliary pin is used, the D/C# signal in conjunction with the auxiliary pin A0 122 is capable of identifying one of two registers. A sample truth table associated with two auxiliary pins, A1 124 and A0 122, is illustrated in FIG. 6, in one embodiment of the invention. As can be seen from the truth table, the logical levels of the auxiliary pins are examined in conjunction with the logical levels of the D/C# signal and chip select (CS#) signal to determine the specific register access requested by the host controller through the control signal.

Accordingly, when signals from auxiliary pin A1 is low, A0 is low, D/C# is low and CS# is low, the type of access requested is for indirect address mode and the data associated with the signal indicates a register index access. When the signals from auxiliary pin A1 is low, A0 is low, D/C# is high and CS# is low, the type of access requested is for indirect address mode and the signal indicates data index access. When the signals from auxiliary pin A1 is low, A0 is high (indicating bypass mode is on), D/C# is low and CS# is low, the type of access requested is direct address mode and the signal indicates a register #1 access. Similarly, when the signals from auxiliary pin A1 is low, A0 is high, D/C# is high and CS# is low, the type of access requested is direct address mode and the signal indicates a register #2 access. Still continuing with the truth table, when the signals from auxiliary pin A1 is high, A0 is low, D/C# is low and CS# is low, the type of access requested is direct address mode and the signal indicates a register #3 access. When the signals from auxiliary pin A1 is high, A0 is low, D/C# is high and CS# is low, the type of access requested is direct address mode and the signal indicates a register #4 access. When the signals from auxiliary pin A1 is high, A0 is high, D/C# is high and CS# is low, the type of access requested is direct address mode and the signal indicates a register #5 access. Thus, with the inclusion of two auxiliary pins, five direct access registers can be directly accessed. With the inclusion of one auxiliary pin, two direct access registers can be directly accessed. Thus as the number of auxiliary pins increases, the number of direct access registers that can be designated by the auxiliary pins increases.

A regular indirect interface is used to identify non-direct access registers that can be accessed by direct access registers bypassing the indirect address mode. In one embodiment illustrated in FIG. 5A, five direct access registers, register #1 through register #5, are defined using a bypass index to allow access to five non-direct access registers. In this embodiment, for example, the bypass index is used to define a set of register locations of non-direct access registers for use in the direct bypass mode. Thus, the contents of direct access registers contain addresses to a non-direct access registers so that indirect address mode may be bypassed when access to these non-direct access registers are requested through the direct address mode. For example, the bypass index may define direct access register #1 such that the contents of direct access register #1 contains address to non-direct access register 10 so that direct access register #1 can directly access non-direct access register 10. Similarly, direct access register #2 may be defined such that the contents of direct access register #2 contains address to non-direct access register 12 so that direct access register #2 can directly access non-direct access register 12. Direct access register #3 may be similarly configured to directly access non-direct access register 14, direct access register #4 may be configured to directly access non-direct access register 16 and direct access register #5 may be configured to directly access non-direct access register 18. Thus, when register #1 is accessed using the logical level of the signals from the auxiliary pin(s) in conjunction with CS# pin and D/C# pin, non-direct access register 10 is directly accessed. Internal register 10 may be a FIFO register. In short, with the 5 bypass ports, access to the first bypass port will be provided by the register #1 index which, in turn, points to non-direct access register 10, and so on.

In order for the feature to allow a host controller to use the direct address mode, one or more direct access registers are defined by the host controller in the register block of the respective device controller 200. The register block of the device controller 200 also includes a plurality of non-direct access registers in addition to a set of direct access registers. The non-direct access registers are used when the direct address mode is not activated. The plurality of direct access registers and non-direct access registers are initialized prior to the receipt of interrupt at the host controller. The host controller includes logic to determine the number of auxiliary pins (bypass ports) that are available for use with a bypass logic. The host controller uses this data to set-up appropriate number of direct access registers for the direct address mode. As the number of pins available for defining the bypass logic may be limited, only required time-critical accesses that have minimal latency and/or accesses that might benefit with direct address mode option are defined using the bypass ports. It should be appreciated that the number of direct access registers may be designated during chip initialization, in one embodiment.

In one embodiment, a set of dedicated pins is used in accessing the direct access registers using a direct bypass path. In this case, if a customer does not use the direct address mode feature, the dedicated pins remain invalid or inactive. In another embodiment, a set of existing GPIO pins are multiplexed to provide access to the direct access registers. In this embodiment, the pins are programmed such that when the direct address mode is activated, access is provided to the direct access registers. When the customer does not use the direct address mode, the pins can be used for alternate functions, such as GPIO. The alternate functions may have already been programmed by a developer when the GPIO pins were originally defined during the design phase of the device controller or may be defined by the host controller to execute an indirect address mode. In the alternate function state, the direct access registers are switched to an inactive state, in one embodiment of the invention.

FIG. 5B illustrates a write burst with interruption that is similar to the register burst write depicted in FIG. 4A. The embodiment of FIG. 5B reduces the number of register index cycles. In FIG. 5B, the sequential write is executed in the form of a burst write to Register 20 when an interrupt occurs to write to Register 30. In one embodiment, at the onset of an interrupt, A0 transition to a high logical level indicating a direct bypass mode at which time a register index cycle occurs to identify the register, Register 30, which is the target of the interrupt. The data from the subsequent data cycle is written to the identified Register 30. After the interrupt has been handled, the pre-interrupt operation is resumed using indirect address mode without the transmission of a register index cycle. This is accomplished by transitioning the D/C# pin to high logical level indicating a data cycle and setting auxiliary pin A0 122 to low indicating non-direct address mode (indirect address mode). The original operation that was interrupted will resume, which in this case is to continue writing data to Register 20. If Register 30 is being frequently referenced, then Register 30 can also be programmed by the host controller using the bypass logic to one of the direct access registers, at which time the register index cycle to identify register 30 during an interrupt can also be eliminated by using the direct address mode. Thus, additional register index cycles can be eliminated leading to a better performing device controller.

FIG. 5C illustrates a read burst with interruption that is similar to the register burst read with interruption depicted in FIG. 4C except that the waveform in FIG. 5C illustrates the elimination of the excess register index cycles. As explained with reference to FIGS. 5A and 5B, additional register index cycles are eliminated by using the direct address mode. Accordingly, register index cycle to second Register 20 is eliminated using the direct address mode.

Figure 7:
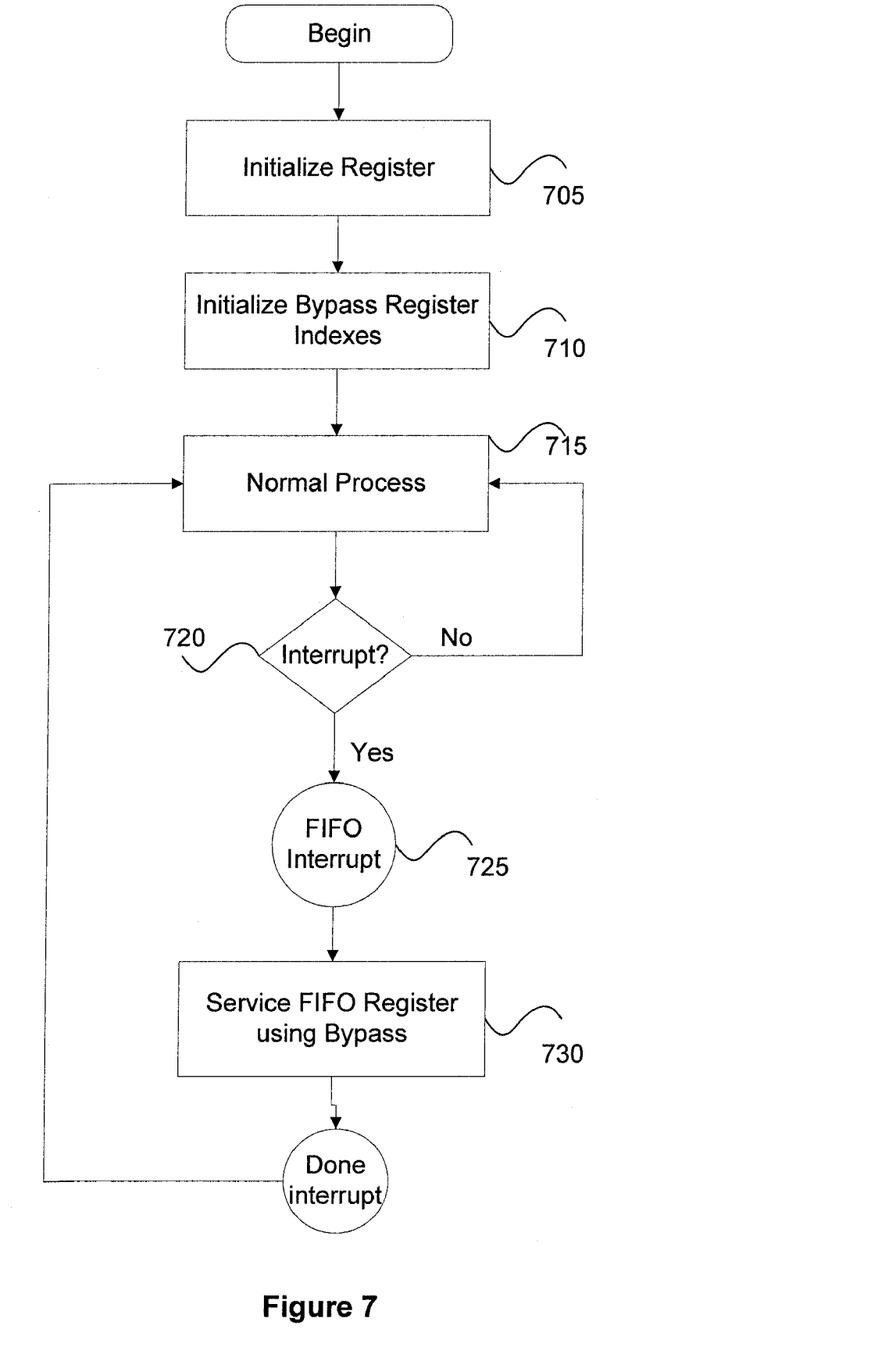
FIG. 7 is a flow chart diagram of the method operations for implementing a direct address mode to access registers of a display controller in accordance with one embodiment of the invention.

FIG. 7 illustrates the flowchart diagram involving the method operations for implementing direct address mode by bypassing indirect interface during an interrupt. The method begins with operation 705, where plurality of registers within the register block is initialized. The register block includes a plurality of direct access registers that are defined by a host controller to access the contents of registers related to one or more time-critical applications/functions. In operation 710, the indices to the plurality of direct access registers (bypass registers) are initialized. The initialization of the registers and the indices are performed at the host controller prior to servicing any interrupt requests. Normal process operations, such as writing to FIFO at the device controller, are performed by the host controller, as illustrated in operation 715. The normal process operation may engage an indirect address mode to write and/or read data using register index cycles and data cycles. The method of FIG. 7 proceeds to a decision block in operation 720 where host controller determines if an interrupt occurred. If an interrupt did not occur then the method loops back to operation 715 where normal process operations are performed by the host controller. If, on the other hand, an interrupt occurred, then the host controller identifies the interrupt as a time-critical FIFO interrupt, as illustrated in operation 725. The FIFO interrupt is effectively handled in a timely fashion in order to either prevent loss of data or data corruption. The method proceeds to operation 730 wherein the interrupt is handled using direct address mode. Thus, the FIFO interrupt is serviced using one of a plurality of bypass registers. Upon completion of service of the interrupt the method loops back to operation 715 where normal process is handled. The process continues until no more data is available for processing.

In summary, a direct addressing scheme using less bus cycles is provided. One skilled in the art will appreciate that a direct addressing scheme for host interfaces provides a set of methods for specifying the indexing and accessing of registers within a plurality of devices. Most devices also have indirect addressing modes where the specified address location is contained in a register index. The use of a pair of pins, either dedicated or multiplexed to already existing pins, such as GPIO pins, provide the ability to opt for direct address mode reducing the number of cycles used in accessing the data. With a lot of multi-tasking operations being processed in parallel, an elimination of one or more cycles in each operation results in a better responsive device overall.

Additionally, in Mobile and other portable devices the amount of available computing resources and space are very limited. With the constant addition of new features and functions, the amount of multi-tasking and the number of time-critical interrupts to be serviced by the processor of the mobile devices, is constantly increasing. With the constant demand placed on the processor, an elimination of one or more cycles in each operation by implementing direct address mode bypassing an indirect interface results in a more responsive mobile device. Thus, reducing even a few index cycles in each operation relieves the burden on the processor substantially resulting in better response from the mobile devices.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A display controller to implement direct address mode bypassing an indirect interface to directly access registers within the display controller, comprising:
   a plurality of direct access registers defined within the display controller;
   at least one non-direct access register;
   a bus interface having,
      a first pin configured to activate the direct address mode; and
      a second pin configured to identify one of the plurality of direct access registers,
      wherein the direct address mode avoids a register index cycle of the indirect interface, and contents of at least one of the plurality of direct access registers includes an address to at the least one non-direct access register.

2. The display controller to implement direct address mode of claim 1, further including a bypass program logic available to a host controller, the bypass program logic at the host controller defining the plurality of direct access registers, the host controller communicatively connected to the display controller.

3. The display controller to implement direct address mode of claim 1, wherein the bus interface further includes an address decode logic module to identify a type of access requested by a control signal from a host controller, the host controller driving the logical levels of the first signal on the first pin and the second signal on the second pin.

4. The display controller to implement direct address mode of claim 3, wherein the bus interface includes a direct bypass module having bypass logic to enable a bypass path to a direct access register based on the type of access requested by the control signal from the host controller.

5. The display controller to implement direct address mode of claim 4, further including a first multiplexer, the first multiplexer controlled by the bypass logic, the first multiplexer selecting the appropriate register address based on the type of access requested from the control signal.

6. The display controller to implement direct access mode of claim 5, further including a second multiplexer, the second multiplexer controlled by the bypass logic to select the appropriate direct access register from the plurality of direct access registers when the direct access mode is enabled.

7. The display controller to implement direct access mode of claim 6, further comprising a register decoder, the register decoder communicatively connected to the first multiplexer to decode the selected register address from the first multiplexer.

8. The display controller to implement direct access mode of claim 1, wherein the plurality of direct access registers and the at least one non-direct access registers are defined within a register block of the display controller, the plurality of direct access registers configured to interact with one or more sub-modules within the device controller through the register block.

9. The display controller to implement direct address mode of claim 1, wherein the first pin and the second pin are multiplexed to a general purpose IO, the first pin and the second pin configured to switch from a direct access function when active to an alternate function when inactive.

10. The display controller to implement direct address mode of claim 2, wherein the first pin and the second pin are dedicated pins defined using the bypass program logic from the host controller.

11. A method for implementing direct address mode bypassing an indirect interface to directly access registers within a display controller, comprising:
   defining a plurality of direct access registers in the display controller, each of the direct access registers containing an address to a non-direct access register so as to provide direct access to a non-direct access register within the display controller, the plurality of direct access registers defined using a bypass program logic available to a host controller, wherein the host controller is communicatively connected to the display controller;
   receiving a control signal from the host controller through a bus interface associated with the host controller;
   examining a status of the control signal to determine activation of direct address mode; and
   enabling access to the non-direct access register through one of the plurality of direct access registers based on the status of the control signal; and
   processing data associated with the non-direct access register without incurring a register index cycle.

12. The method for implementing direct address mode of claim 11, wherein processing data associated with the non-direct access register is in response to receiving an interrupt.

13. The method for implementing direct address mode of claim 11, wherein receiving a control signal from a host controller further including:
   receiving a first signal on a first pin, the first pin configured to activate the direct address mode; and
   receiving a second signal on a second pin, the second pin configured to identify one of the plurality of direct access registers based on a logical level of the second signal on the second pin.

14. The method for implementing direct address mode of claim 13, wherein examining the control signal further including examining a logical level of the first signal on the first pin, the logical level of the first signal determining activation of the direct address mode.

15. The method for implementing direct address mode of claim 14, wherein the identification of one of the plurality of direct access registers is based upon a logical level of a second signal on the second pin when the first signal on the first pin indicates a direct address mode.

16. The method for implementing direct address mode of claim 15, wherein the plurality of direct access registers are configured to switch between an active state and an inactive state based on the logical level of the first signal on the first pin.

17. The method for implementing direct address mode of claim 16, further including:
   providing access to one of the plurality of direct access registers in the display controller when the direct address mode is activated; and
   providing access to the at least one non-direct access registers in the display controller when the direct address mode is deactivated.

18. The method for implementing direct address mode of claim 11, further including initializing the plurality of non-direct access registers and the at least one direct access registers prior to receiving the control signal.

19. The method for implementing direct address mode of claim 12, wherein the interrupt is a time-critical interrupt.

20. A device for implementing direct address mode bypassing an indirect interface, comprising:

a host controller configured to provide a control signal using a bus interface;

a display controller configured to communicate with the host controller, the display controller having an indirect interface block configured to decode and route the control signal received from the host controller, the indirect interface block further including, address decode logic configured to determine a type of access requested through an auxiliary pin;

bypass logic configured to enable access to one of a plurality of direct access registers defined within the display controller, each one of the plurality of direct access registers configured to map to a non-direct access register; and a selection circuitry configured to select output from the one of the plurality of direct access registers based on output from the bypass logic available to the display controller; and wherein the bypass logic and selection circuitry avoids a register index cycle when the device controller receives an interrupt from the host controller, wherein the interrupt is a time-critical interrupt.

21. The device for implementing direct address mode of claim 20, wherein the selection circuitry is further configured to select one of a register index of a non-direct access register or the output from one of the plurality of direct access registers, wherein the selection circuitry includes, a first multiplexer configured to select one of the register index of a non-direct access register or a direct access register based on the type of access requested; and a second multiplexer configured to select an appropriate direct access register from the plurality of direct access registers, the selection of the direct access register by the second multiplexer controlled by the bypass logic and the type of access requested.

22. The device for implementing direct address mode of claim 20, wherein the control signal includes a plurality of signals transmitted on corresponding pins, the corresponding pins including, i. a first pin to transmit a first signal; and ii. a second pin to transmit a second signal, wherein the first pin is configured to determine the type of access requested based on a logical level of the first signal, and the second pin is configured to identify an output from the one of the plurality of direct access registers when the first signal is asserted based on a logical level of the second signal.

23. The device for implementing direct address mode of claim 22, wherein the first pin and the second pin are multiplexed to a general purpose IO.

* * * * *